United States Patent [19]

Gray

[11] Patent Number: 5,169,174

[45] Date of Patent: Dec. 8, 1992

[54] SEAT BELT SHOULDER STRAP ADJUSTMENT GUIDE APPARATUS

[75] Inventor: Philip H. Gray, Ste-Anne-de-Bellevue, Canada

[73] Assignee: Westech Innovations Inc., Quebec, Canada

[21] Appl. No.: 742,835

[22] Filed: Aug. 8, 1991

[51] Int. Cl.$^5$ .............................................. B60R 22/10
[52] U.S. Cl. ..................................... 280/808; 297/483
[58] Field of Search ................. 280/801, 808; 297/468, 297/481, 483

[56] References Cited

U.S. PATENT DOCUMENTS

| | | | |
|---|---|---|---|
| 4,796,919 | 1/1989 | Linden | 280/808 |
| 4,799,737 | 1/1989 | Greene | 297/468 |
| 4,832,367 | 5/1989 | Lisenby | 280/808 |
| 4,938,535 | 1/1990 | Condon et al. | 297/483 |
| 4,946,198 | 8/1990 | Pittore et al. | 280/808 |

FOREIGN PATENT DOCUMENTS

88/04622  6/1988  World Int. Prop. O. .......... 280/801

*Primary Examiner*—Charles A. Marmor
*Assistant Examiner*—Tamara L. Graysay
*Attorney, Agent, or Firm*—Collard & Roe

[57] ABSTRACT

The apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle, may comprise; an upper shoulder strap feeder fastener for holding and guiding the shoulder strap from the upper side wall mounting at a point substantially along the standard path at a side of the reduced height passenger adjacent the mounting; a middle shoulder strap locating fastener for holding and guiding the shoulder strap from the upper shoulder strap feeder fastener to the lower buckle clasp; a lower belt fastener attachable to a lap strap of the seat belt; and a body member interconnecting the upper shoulder strap feeder fastener, the middle shoulder strap locating fastener and the lower belt fastener. In this way, by fastening the apparatus to the seat belt, the shoulder strap is redirected from the standard path to the lowered path so that the shoulder belt strap extends from the middle shoulder strap locating fastener to the lower buckle clasp across the torso of the reduced height passenger. The apparatus is easy to install, operates effectively and can be manufactured inexpensively.

14 Claims, 2 Drawing Sheets

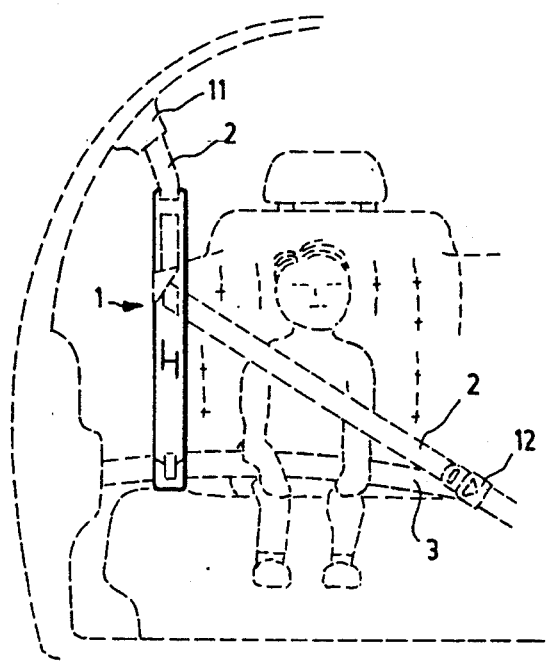
FIG. 1
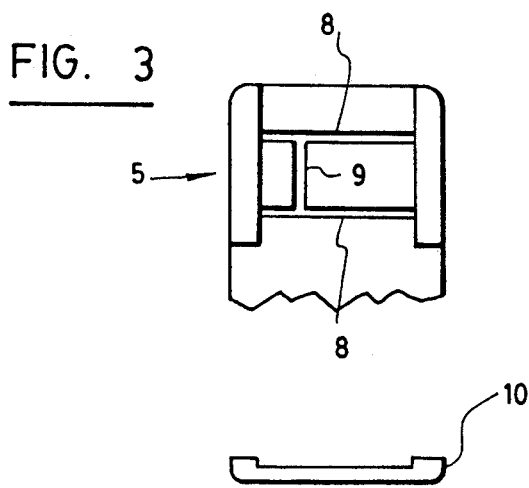
FIG. 3
FIG. 4
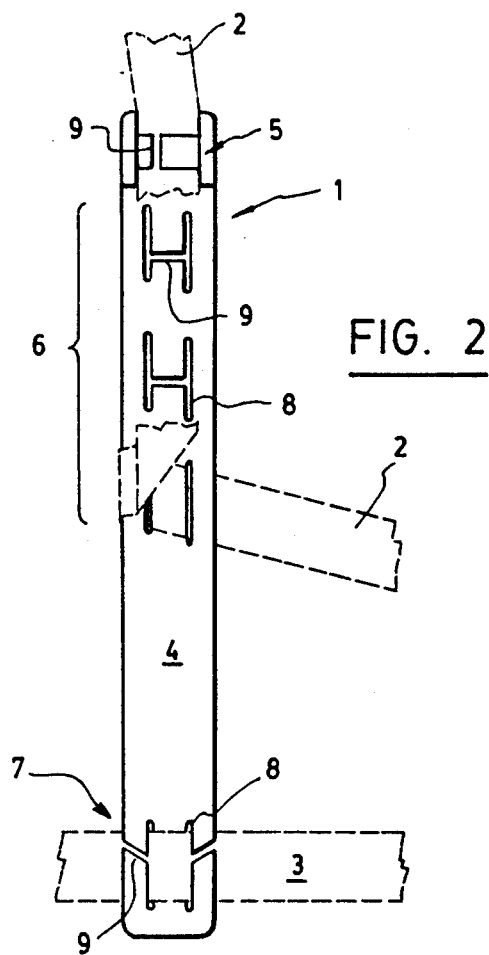
FIG. 2

SEAT BELT SHOULDER STRAP ADJUSTMENT GUIDE APPARATUS

FIELD OF THE INVENTION

The present invention relates to a seat belt shoulder strap adjustment guide apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle. The invention is typically used for making automobile seat belts having shoulder straps usable by reduced height passengers such as children.

BACKGROUND OF THE INVENTION

As car safety progresses, an increased awareness for passengers safety is being perceived with resulting innovations in many areas. One of these innovations is the installation of seat belts having a waist/shoulder strap in the rear seats of new cars in addition to the standard installation in the front seats. Upon first impression, this appears to be a logical safety improvement and for most adults this is the case, however, for passengers of a reduced height, especially children, it is a potential for serious injury.

For children under the height of 95 cm, conventional child seats are used to secure the child safely in a vehicle. However, for children between the height of 95 and 155 cm, a child safety seat is too small and the conventional seat belt is ineffective in safely securing the child in the vehicle. It is known in the prior art to provide a shoulder belt adjuster for the purposes of reducing the height of the shoulder strap anchor point to a height which more suitably fits the reduced height passenger.

In U.S. Pat. No. 4,799,737 an auxiliary adjusting device for the shoulder strap of a seat belt is described, the device being mounted to a side wall of the vehicle at a given reduced height and having a yoke for guiding the shoulder strap through the device. In U.S. Pat. No. 4,796,919, a clamp device is disclosed for clamping the diagonal run of the shoulder belt to the vertical run of the shoulder belt to reduce the height of the diagonal run. In U.S. Pat. No. 4,938,535, an adjustable shoulder/lap seat belt adaptor is described in which a strap secured at one end to the lap belt is wrapped around and fastened to the shoulder strap while maintaining the shoulder strap at a lowered position in order to accommodate a reduced height passenger. In U.S. Pat. No. 4,946,198, a similar adaptor has a safety strap clipped between a shoulder belt fastener and a lap belt fastener.

In the conventional devices, the shoulder belt can be pulled by the child without the device preventing the shoulder belt from being placed by the child under his arms and essentially to a useless position.

Also, in the conventional devices, no device provides an adequate combination of low cost, ease of installation, and efficient operation during normal use and collision.

SUMMARY OF THE INVENTION

According to the invention, there is provided a seat belt shoulder strap adjustment guide apparatus which is easy to install and remove from the seat belt. Also, according to the invention there is provided a seat belt shoulder strap adjustment guide apparatus which prevents the shoulder strap from being pulled down easily out of its selected safest position for the child.

According to the invention, there is provided a seat belt shoulder strap adjustment guide apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle, the apparatus comprising: shoulder strap locating fastening means for holding and guiding the shoulder strap from the upper side wall mounting at a point substantially along the lowered path at a side of the reduced height passenger adjacent said mounting to the lower buckle clasp; lower belt fastening means attachable to a lap strap of the seat belt; and a plastic body member interconnecting the upper shoulder strap locating fastening means and the lower belt fastening means, whereby by fastening the apparatus to the seat belt, the shoulder strap is redirected from the standard path to the lowered path so that the shoulder strap extends from the shoulder strap locating fastening means to the lower buckle clasp across the torso of the reduced height passenger and is held in position in such a way as to prevent being lowered by the reduced height passenger.

According to the invention, there is also provided a seat belt shoulder strap adjustment guide apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle, the apparatus comprising: upper shoulder strap feeder fastening means for holding and guiding the shoulder strap from the upper side wall mounting at a point substantially along the standard path at a side of the reduced height passenger adjacent the mounting; middle shoulder strap locating fastening means for holding and guiding the shoulder strap from the upper shoulder strap feeder fastening means to the lower buckle clasp; lower belt fastening means attachable to a lap strap of the seat belt; and a body member interconnecting the upper shoulder strap feeder fastening means, the middle shoulder strap locating fastening means and the lower belt fastening means. By fastening the apparatus to the seat belt, the shoulder strap is redirected from the standard path to the lowered path so that the shoulder belt strap extends from the middle shoulder strap locating fastening means to the lower buckle clasp across the torso of the reduced height passenger.

Preferably, the apparatus is made from a substantially flat sheet of plastic material, and wherein all of the fastening means each comprise a pair of T-shaped slots in the plastic sheet, each pair of T-shaped slots having parallel segments of a width sufficient to receive the seat belt and stems extending from each parallel segment, the stems having open ends opposite the parallel segments through which the seat belt can be fed for fastening the seat belt in the pair of T-shaped slots. The shoulder strap extending between the upper shoulder strap feeder fastening means and the middle shoulder strap locating fastening means can be diagonally folded to turn and wrap around a side of the flat sheet proximal the vehicle side wall as the shoulder strap extends between the upper shoulder strap feeder fastening means and the middle shoulder strap locating fastening means. Preferably, the pair of T-shaped slots have stems which join one another, so that the slot is substantially H-shaped. The stems of the T-shaped slots may also open onto opposite sides of the flat sheet of plastic.

Preferably, the pair of parallel T-shaped slots of the upper shoulder strap feeder fastening means have substantially horizontal segments and interconnecting stems thus forming a sideways oriented H-shaped slot; the parallel T-shaped slots of the middle shoulder strap locating fastening means have segments which are substantially vertical and stems which are interconnected forming an upstanding H-shaped slot, the middle shoulder strap locating fastening means including a plurality of the upstanding H-shaped slots at different heights in the plastic member below the H-shaped slot of the upper shoulder strap feeder fastening means; and the T-shaped slot members of the lower belt fastening means have substantially vertical segments and stems forming an acute angle with respect to the parallel segments, the stems connecting with opposite sides of the flat sheet. By selectively fitting the shoulder strap through one of the H-shaped slots of the middle shoulder strap locating fastening means, a suitable height of the shoulder strap with respect to the reduced height passenger may be selected.

BRIEF DESCRIPTION OF THE DRAWINGS

The invention will now be better understood by way of the following description of preferred embodiments with reference to the appended drawings, in which:

FIG. 1 is a front sectional view of a child seated in a vehicle seat and retained by a conventional seat belt provided with the apparatus according to the first preferred embodiment;

FIG. 2 is a front view of the apparatus according to the first preferred embodiment showing a portion of the shoulder strap fed therethrough and a portion of the lap strap fed therethrough;

FIG. 3 is an enlarged breakaway front view of the upper end of the apparatus according to the first preferred embodiment;

FIG. 4 is an end view of the apparatus as shown in FIG. 3; and

DETAILED DESCRIPTION OF THE PREFERRED EMBODIMENTS

Figure 5:
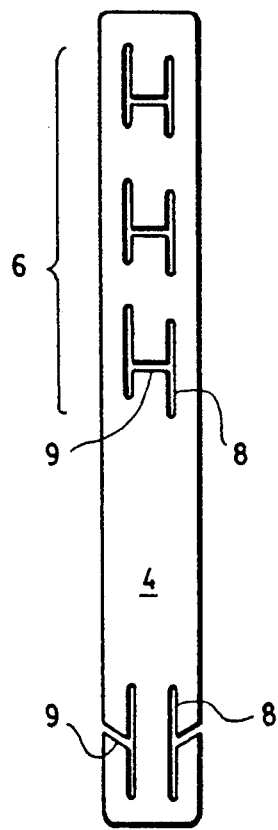
FIG. 5 is a front view of the apparatus according to the second preferred embodiment.

In the first preferred embodiment, the seat belt shoulder strap adjustment guide apparatus (1), as shown in FIGS. 1 and 2, is provided with a plurality of H-shaped slots through which shoulder strap (2) is fed. Horizontally disposed H-shaped slot (5) provides upper shoulder strap feeder fastening means for holding and guiding the shoulder strap (2) from the upper side wall mounting (11). A standard path of shoulder strap (2) is shown in dashed lines in FIG. 1, and strap (2) extends from mounting (11) to upper shoulder strap feeder fastening means (5) along substantially the standard path. The strap (2) is then guided through the H-shaped slot of means (5) and continues downwardly towards one of three H-shaped slots (6) forming the middle shoulder strap locating fastening means. Strap (2) is folded 90° so that it turns laterally outwards away from the passenger of reduced height, and the strap (2) is then folded around an outer edge of plastic sheet (4) before passing through middle shoulder strap locating fastening means (6). The lap or waist strap (3) of the seat belt is fastened to the lower belt fastening means (7) which comprises a pair of T-shaped slots having parallel top segments (8) each having a depending stem (9) which is open ended. The H-shaped slots of the upper shoulder strap feeder fastening means (5) and the middle shoulder strap locating fastening means (6) similarly comprise parallel segments (8) with depending stems (9) which are open ended, except in the case of the H-shaped slots, the open ends of the stems (9) are provided by the fact that the stems (9) are interconnected, thus forming the H-shape from 2 joined T-shaped slots.

As is shown in FIG. 2, the H-shaped slots of middle shoulder strap locating fastening means (6) have parallel slot segments (8) which are shifted relative to one another in order to receive strap (2) at the appropriate angle when it lies in its lowered path as shown in FIG. 1. The crossing stem (9) of the H-shaped slots (6) is provided lower down for ease of fastening strap (2) to the slot (6) and for greater strength when strap (2) is subjected to force during an accident.

As shown in FIGS. 3 and 4, upper belt fastening means (5) comprise an H-shaped slot having parallel segments (8) and a cross stem (9). Segments (8) of slot (5) are not angled towards mounting (11) or staggered in order to receive strap (2) at an angle significantly directed towards mounting (11) as if strap (2) were coming from buckle (12), since in the preferred embodiment, the width of plastic sheet (4) is kept to the minimum possible width, and therefore the sides of flat sheet (4) at its upper end are reinforced with ridges (10) into which strap (2) is guided before passing through slot segments (8). As is shown, cross stem (9) is provided on a side of the side wall mounting (11) so that if strap (2) is pulled away towards side wall mounting (11), strap (2) will not become exposed to cross slot (9).

As can be understood, the apparatus (1) attaches to shoulder strap (2) in such a manner that flat sheet (4) will not slide along strap (2) while being securely fastened to waist strap (3) by lower belt fastening means (7). Once the existing shoulder strap (2) is fitted into the slots (8) and (9) of fastening means (5) and (6), making sure that strap (2) is fed through the appropriate slots (6) considering the height of the child seated in the vehicle, waist strap (3) is fit through slots (7) as shown in the figures, and the shoulder strap (2) is securely adjusted to a lowered path without severely affecting standard operation of the seat belt. In the case that the seat belt includes an inertial locking system for the shoulder strap (2), the force of the child's body on strap (2) is transferred to the flat sheet (4) at middle shoulder strap locating fastening means (6), and is then transferred to belt (2) leading to mounting (11) by upper shoulder strap feeder fastening means (5). The direct uninhibited transfer improves the ability of an inertial shoulder strap locking means to engage, and once engaged, an additional impact absorption is provided to the child, since the flat sheet of plastic material (4) providing the body of the apparatus (1) will flex as the seat belt pulls on it on impact.

According to the second preferred embodiment, the apparatus (1) is constructed without the upper shoulder strap feeder slot or fastening means (5), and although the shoulder strap (2) is then fed to the side wall mounting (11) at a lower angle than the standard path, the feature of the invention that the shoulder strap (2) is held in position along the reduced height path, without the child or reduced height passenger being able to pull down the shoulder strap (2) due to the solid plastic body member (4) is provided. The plastic body (4) also offers a certain flex during an accident which reduces the impact force of the shoulder strap (2) on the passenger.

In the first preferred embodiment, the flat sheet of plastic material (4) can measure 6 cm wide×60 cm long and can be 3 mm thick. In the second preferred embodiment the sheet can be 50 cm long. The plastic material can be polypropylene, as this material gives maximum strength while allowing the required amount of flexibility. The properties of polypropylene remain constant over a wide temperature range. Ultraviolet protection can be achieved by the addition of known chemicals to the plastic prior to the manufacturing process. Apparatus (1) can be easily manufactured by a simple injection molding process.

It is to be understood that the above description of the preferred embodiment is not intended to limit the scope of the present invention as defined in the appended claims.

I claim:
1. A seat belt shoulder strap adjustment guide apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle, the apparatus comprising:
 upper shoulder strap feeder fastening means for holding and guiding the shoulder strap from the upper side wall mounting at a point substantially along the standard path at a side of the reduced height passenger adjacent said mounting;
 middle shoulder strap locating fastening means for holding and guiding the shoulder strap from the upper shoulder strap feeder fastening means to the lower buckle clasp;
 lower belt fastening means attachable to a lap strap of the seat belt; and
 a body member interconnecting the upper shoulder strap feeder fastening means, the middle shoulder strap locating fastening means and the lower belt fastening means, whereby by fastening the apparatus to the seat belt, the shoulder strap is redirected from the standard path to the lowered path so that the shoulder belt strap extends from the middle shoulder strap locating fastening means to the lower buckle clasp across the torso of the reduced height passenger.

2. The apparatus as claimed in claim 1, wherein the apparatus is made from a substantially flat sheet of plastic material, and wherein said upper, said middle, and said lower fastening means each comprise a pair of T-shaped slots in the plastic sheet, each pair of T-shaped slots having parallel segments of a width sufficient to receive the seat belt and stems extending from each parallel segment, the stems having open ends opposite the parallel segments through which the seat belt can be fed for fastening the seat belt in said pair of T-shaped slots, whereby the shoulder strap extending between the upper shoulder strap feeder fastening means and the middle shoulder strap locating fastening means can be diagonally folded to turn and wrap around a side of the flat sheet proximal said vehicle side wall as the shoulder strap extends between the upper shoulder strap feeder fastening means and the middle shoulder strap locating fastening means.

3. The apparatus as claimed in claim 2, wherein said pair of T-shaped slots have stems which join one another, whereby said slots form substantially an H-shaped slot.

4. The apparatus as claimed in claim 2, wherein said stems of said T-shaped slots open onto opposite sides of the flat sheet.

5. Apparatus as claimed in claim 2, wherein:
 the pair of parallel T-shaped slots of the upper shoulder strap feeder fastening means have substantially horizontal segments and interconnecting stems, thus forming a sideways oriented H-shaped slot;
 the parallel T-shaped slots of the middle shoulder strap locating fastening means have segments which are substantially vertical and stems which are interconnected forming an upstanding H-shaped slot, the middle shoulder strap locating fastening means including a plurality of the upstanding H-shaped slots at different heights in the plastic member below the H-shaped slot of the upper shoulder strap feeder fastening means; and
 the T-shaped slot members of the lower belt fastening means have substantially vertical segments and stems forming an acute angle with respect to the parallel segments, the stems connecting with opposite sides of the flat sheet, whereby by selectively fitting the shoulder strap through one of the H-shaped slots of the middle shoulder strap locating fastening means, a suitable height of the shoulder strap with respect to the reduced height passenger may be selected.

6. Apparatus as claimed in claim 5, wherein the plurality of upstanding H-shaped slots have staggered segments for receiving diagonally the shoulder strap at an average angle of the shoulder strap when in said lowered path.

7. Apparatus as claimed in claim 5, wherein the plurality of H-shaped slots are three in number.

8. A seat belt shoulder strap adjustment guide apparatus for redirecting a shoulder strap of a vehicle's seat belt from a standard path, the standard path extending between a lower buckle clasp to an upper vehicle side wall mounting across a torso of an average height adult passenger of the vehicle, to a lowered path extending from the lower buckle clasp across a torso of a reduced height passenger of the vehicle to said passenger's shoulder opposite the buckle clasp, the apparatus comprising:
 shoulder strap locating fastening means for holding and guiding the shoulder strap from the upper side wall mounting at a point substantially along the lowered path at a side of the reduced height passenger adjacent said mounting to the lower buckle clasp;
 lower belt fastening means attachable to a lap strap of the seat belt on a side of the passenger opposite the buckle clasp; and
 a plastic body member interconnecting the shoulder strap locating fastening means and the lower belt fastening means, the plastic body extending vertically upwardly from said lower belt fastening means to said shoulder strap locating fastening means when said lap strap is fed through said lower belt fastening means, such that said shoulder strap locating fastening means are located approximately at a shoulder of said reduced height passenger, whereby by fastening the apparatus to the seat belt, the shoulder strap is redirected from the standard path to the lowered path so that the shoulder belt strap extends from the shoulder strap locating fastening means to the lower buckle clasp across the torso of the reduced height passenger and is held in position in such a way as to prevent being lowered by the reduced height passenger.

9. A seat belt shoulder strap adjustment guide apparatus for redirecting a should strap of a vehicle's seat belt from a standard path, the standard path extending between a lower buckle clasp to an upper vehicle side wall mounting across a torso of an average height adult passenger of the vehicle, to a lowered path extending across a torso of a reduced height passenger of the vehicle, the apparatus comprising:

shoulder strap locating fastening means for holding and guiding the shoulder strap from the upper side wall mounting at a point substantially along the lowered path at a side of the reduced height passenger adjacent said mounting to the lower buckle clasp;

lower belt fastening means attachable to a lap strap of the seat belt; and a plastic body member interconnecting the shoulder strap locating fastening means and the lower belt fastening means, the apparatus being made from a substantially flat sheet of plastic material, and said shoulder strap locating fastening means and said lower belt fastening means each comprising a pair of T-shaped slots in the plastic sheet, each pair of T-shaped slots having parallel segments of a width sufficient to receive the seat belt and stems extending from each parallel segment, the stems having open ends opposite the parallel segments through which the seat belt can be fed for fastening the seat belt in said pair of T-shaped slots whereby by fastening the apparatus to the seat belt, the shoulder strap is redirected from the standard path to the lowered path so that the shoulder belt strap extends from the shoulder strap locating fastening means to the lower buckle clasp across the torso of the reduced height passenger and is held in position in such a way as to prevent being lowered by the reduced height passenger.

10. The apparatus as claimed in claim 9, wherein said pair of T-shaped slots have stems which join one another, whereby said slots form a substantially H-shaped slot.

11. The apparatus as claimed in claim 9, wherein said stems of said T-shaped slots open onto opposite sides of the flat sheet.

12. Apparatus as claimed in claim 9, wherein:

the parallel T-shaped slots of the shoulder strap locating fastening means have segments which are substantially vertical and stems which are interconnected forming an upstanding H-shaped slot, the shoulder strap fastening means including a plurality of the upstanding H-shaped slots at different heights in the plastic member; and T-shaped slot members of the lower belt fastening means have substantially vertical segments and stems forming an acute angle with respect to the parallel segments, the stems connecting with opposite sides of the flat sheet, whereby by selectively fitting the shoulder strap through one of the H-shaped slots of the middle shoulder strap fastening means, a suitable height of the shoulder strap with respect to the reduced height passenger may be selected.

13. Apparatus as claimed in claim 12, wherein the plurality of upstanding H-shaped slots have staggered segments for receiving diagonally the shoulder strap at an average angle of the shoulder strap when in said lowered path.

14. Apparatus as claimed in claim 12, wherein the plurality of H-shaped slots are three in number.

* * * * *